June 22, 1926.

J. ROBIN 1,589,863

SWIVEL FOR USE IN FISHING TACKLE

Filed March 12, 1925

Witnesses:

Inventor:
Joannès Robin

Patented June 22, 1926.

1,589,863

UNITED STATES PATENT OFFICE.

JOANNÈS ROBIN, OF LYON, FRANCE.

SWIVEL FOR USE IN FISHING TACKLE.

Application filed March 12, 1925, Serial No. 15,119, and in France March 24, 1924.

This invention relates to swivels for fishing tackle, for spinning, bait casting and other fishing, and has for its object to improve the rotary bearings, by replacing the ordinary contact or frictional bearing by ball bearings, thus greatly adding to the efficiency of the device by doing away with friction.

According to one particular method of carrying out the invention, the swivel comprises a ball race interposed between a washer carried by an enlarged head on the attachment pin and the inner face of the end or head of the swivel, the balls being carried in a space bounded by the said washer, the pin, the inner face of the head and the inner wall of a cylindrical sleeve forming part of the swivel device.

Another ball race is provided between the attachment pin, the inner walls of a recess in the head of the swivel and the surface of a specially shaped collar surrounding the attachment pin.

The annexed drawing illustrates one method of carrying out the invention, and shows one half of the swivel having two ball races, the other half being symmetrical thereto.

Figure 1:
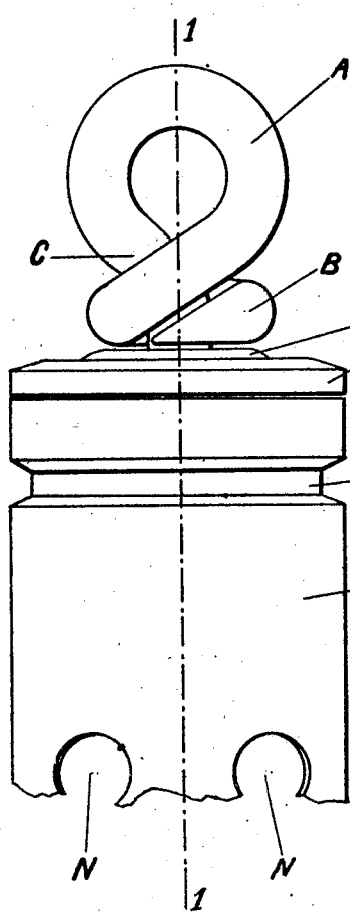
Fig. 1 is an elevation of half of the swivel, drawn to a greatly enlarged scale.
Figure 2:
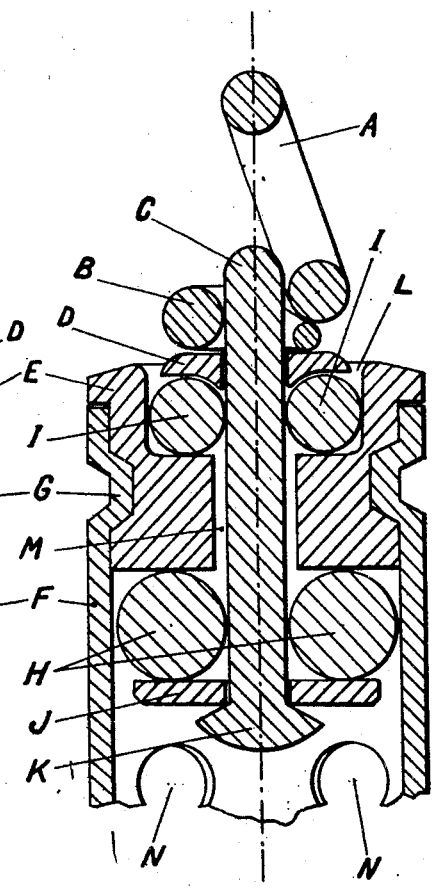
Fig. 2 is a vertical section on the line 1—1 Fig. 1.

A is the loop, the twisted portion B of which surrounds and is formed with or connected to the attachment pin C. D is the special collar forming part of the upper ball race. E is the head of the swivel. F is the cylindrical sleeve connecting the two heads or ends, the said head being provided with a circumferential groove or channel into which the metal of the sleeve is pressed thus holding the head from longitudinal movement in the sleeve F. I are the balls of the upper race.

The pin C is provided with an enlarged end or head K upon which is carried the washer J. H are the balls of the lower race, which is thus bounded by the pin C, the outer cylinder F, the washer J and the inner surface of the head E.

There is a certain amount of play in the axial direction between the collar D which is kept in position by the twisted portion B and the enlarged head K and washer J, thus allowing for free rotation whilst keeping the parts in position.

The perforation M in the head of the swivel is of such diameter that allowance is made for any radial play of the collar D and the washer J, and so that the pin will not come into actual contact with the head E.

It will be understood that in the arrangement illustrated similar parts and ball races are provided at the other end of the sleeve F.

N are perforations in the wall of the sleeve F.

As compared with the ordinary swivel device for fishing tackle, the improved swivel possesses important advantages as whilst with the frictional bearings considerable resistance is offered to rotation leading to twisting of the fishing line, with the improved swivel this drawback is completely eliminated.

What I claim and desire to secure by Letters Patent of the United States of America is:—

A swivel for fishing tackle comprising in combination two end members each of which is provided with a central perforation with a recess at the outer end, and with a circumferential groove on the outside, a sleeve connecting the said end members and pressed into the said grooves to hold the end members from longitudinal movement in the sleeve, a pin passing through the central perforation in each of the said end members, and terminating at one end in an enlarged head coming in the interior of the sleeve, a washer on the said pin coming between the enlarged head and the associated end members, balls forming a ball bearing interposed between the said washer and the inner surface of the end member and the sleeve, other balls located in the recess in the end member, a perforated collar around the pin and coming above the last mentioned balls on the exterior of the sleeve, a loop at the outer and other end of the pin for attachment to a fishing line and a twist of wire around the pin above the perforated collar for holding the said collar in position and formed from the integral outer extremity of the pin for the purposes set forth.

In witness whereof I affix my signature.

ROBIN, JOANNES.